US011323687B2

(12) United States Patent
Lacaze et al.

(10) Patent No.: US 11,323,687 B2
(45) Date of Patent: May 3, 2022

(54) SENSING ON UAVS FOR MAPPING AND OBSTACLE AVOIDANCE

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US); Raymond Paul Wilhelm, III, Gaithersburg, MD (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 527 days.

(21) Appl. No.: 16/045,795

(22) Filed: Jul. 26, 2018

(65) Prior Publication Data

US 2019/0068954 A1   Feb. 28, 2019

Related U.S. Application Data

(63) Continuation of application No. 15/176,229, filed on Jun. 8, 2016.

(Continued)

(51) Int. Cl.
*H04N 13/243* (2018.01)
*B64C 39/02* (2006.01)
(Continued)

(52) U.S. Cl.
CPC ......... *H04N 13/243* (2018.05); *B64C 39/024* (2013.01); *G01B 11/245* (2013.01); *G01B 11/2518* (2013.01); *G01B 11/2545* (2013.01); *G01S 7/4813* (2013.01); *G01S 7/4815* (2013.01); *G01S 7/4816* (2013.01); *G01S 17/08* (2013.01); *G01S 17/42* (2013.01); *G01S 17/48* (2013.01); *G01S 17/89* (2013.01); *G01S 17/933* (2013.01); *H04N 13/271* (2018.05); *B64C 2201/024* (2013.01); *B64C 2201/027* (2013.01);

(Continued)

(58) Field of Classification Search
None
See application file for complete search history.

(56) References Cited

U.S. PATENT DOCUMENTS 9,720,413 B1 *   8/2017   Lema ................... B64C 39/024
9,798,322 B2 * 10/2017   Bachrach ............. G05D 1/0016
(Continued)

*Primary Examiner* — Aniss Chad
*Assistant Examiner* — Mahmoud M Kazimi
(74) *Attorney, Agent, or Firm* — RowanTree Law Group, PLLC; Carson C. K. Fincham

(57) ABSTRACT

Structured light approaches utilize a laser to project features, which are then captured with a camera. By knowing the disparity between the laser emitter and the camera, the system can triangulate to find the range. Four, 185 degree field-of-view cameras provide overlapping views over nearly the whole unit sphere. The cameras are separated from each other to provide parallax. A near-infrared laser projection unit sends light out into the environment, which is reflected and viewed by the cameras. The laser projection system will create vertical lines, while the cameras will be displaced from each other horizontally. This relative shift of the lines, as viewed by different cameras, enables the lines to be triangulated in 3D space. At each point in time, a vertical stripe of the world will be triangulated. Over time, the laser line will be rotated over all yaw angles to provide full a 360 degree range.

6 Claims, 9 Drawing Sheets

Related U.S. Application Data

(60) Provisional application No. 62/175,231, filed on Jun. 13, 2015.

(51) Int. Cl.

| | |
|---|---|
| *G01B 11/245* | (2006.01) |
| *G01B 11/25* | (2006.01) |
| *G01S 7/481* | (2006.01) |
| *G01S 17/08* | (2006.01) |
| *G01S 17/42* | (2006.01) |
| *G01S 17/48* | (2006.01) |
| *G01S 17/89* | (2020.01) |
| *G01S 17/933* | (2020.01) |
| *H04N 13/271* | (2018.01) |
| *H04N 13/00* | (2018.01) |
| *H04N 13/128* | (2018.01) |
| *H04N 13/254* | (2018.01) |

(52) U.S. Cl.
CPC .. *B64C 2201/108* (2013.01); *B64C 2201/123* (2013.01); *B64C 2201/14* (2013.01); *B64C 2201/162* (2013.01); *H04N 13/128* (2018.05); *H04N 13/254* (2018.05); *H04N 2013/0081* (2013.01)

(56) References Cited

U.S. PATENT DOCUMENTS

| | | | |
|---|---|---|---|
| 10,495,735 B2 * | 12/2019 | Shintani | G02B 26/0833 |
| 10,536,684 B2 * | 1/2020 | Shintani | G06T 5/002 |
| 10,589,860 B2 * | 3/2020 | Campbell | H04N 5/2256 |
| 10,672,281 B2 * | 6/2020 | Fanelli | G08G 5/0013 |
| 10,795,022 B2 * | 10/2020 | Shintani | H04N 13/128 |
| 2016/0070265 A1 * | 3/2016 | Liu | G05D 1/0088 |
| | | | 701/3 |
| 2017/0221226 A1 * | 8/2017 | Shen | G06T 7/80 |
| 2018/0095459 A1 * | 4/2018 | Bachrach | G05D 1/0038 |

* cited by examiner

SENSING ON UAVS FOR MAPPING AND OBSTACLE AVOIDANCE

CROSS REFERENCE TO RELATED APPLICATIONS

This Application claims priority from and is a Continuation Patent Application of U.S. patent application Ser. No. 15/176,229, entitled "SENISING ON UAVS FOR MAPPING AND OBSTACLE AVOIDANCE", filed on Jun. 8, 2016.

U.S. patent application Ser. No. 15/176,229 claims priority from U.S. Patent Application Ser. No. 62/175,231, entitled "SENISING ON UAVS FOR MAPPING AND OBSTACLE AVOIDANCE", filed on 13 Jun. 2015. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates to UAVs. More specifically, the present invention is related to providing structured light and time of flight sensors on UAVs for obstacle avoidance and creating mapping capabilities.

BACKGROUND OF THE INVENTION

There are few sensors that are well suited for autonomous mobility and mapping functions on small aerial platforms. LADAR choices that can fit the SWAP requirements are severely limited; few LADARs are available within the SWAP. One option, the single line sensor, needs to be configured into an up-down tilt configuration, the so called "yes-yes" ladar, or into a side to side pan configuration, so called "no-no" ladar, in order to get the coverage needed to traverse a complex environment.

Some other sensors provide a relatively small vertical field-of-view. Quadrotors of a small size and weight create significant pitch when traveling at high speeds. This pitch can be as high as 45 degrees when traveling at high speeds, or when quadrotors are used in windy areas.

Therefore, if a sensor with relatively small vertical field of view is installed horizontally, the vehicle will be blind in the direction of travel at high speeds. Once again, there is a need of a tilt mechanism.

The other approach, which better fits the SWAP constraints of a quadrotor, is stereo vision- or structure from motion. However, in both cases, poor lighting of an indoor environment—together with the lower quality optics camera combinations that can be carried with the quads—makes it a poor choice. Many attempts like this have been performed in the past few years, with very poor results.

Definitions

LADAR (also known as LIDAR) is an optical remote sensing technology that can measure the distance to, or other properties of a target by illuminating the target with light, often using pulses from a laser. LIDAR technology has application in geomatics, archaeology, geography, geology, geomorphology, seismology, forestry, remote sensing and atmospheric physics, as well as in airborne laser swath mapping (ALSM), laser altimetry and LIDAR contour mapping. The acronym LADAR (Laser Detection and Ranging) is often used in military contexts. The term "laser radar" is sometimes used, even though LIDAR does not employ microwaves or radio waves and therefore is not radar in the strict sense of the word.

In computing, a graphical user interface (GUI, commonly pronounced gooey) is a type of user interface that allows users to interact with electronic devices using images rather than text commands. GUIs can be used in computers, hand-held devices such as MP3 players, portable media players or gaming devices, household appliances and office equipment. A GUI represents the information and actions available to a user through graphical icons and visual indicators such as secondary notation, as opposed to text-based interfaces, typed command labels or text navigation. The actions are usually performed through direct manipulation of the graphical elements.

MAPHAC is a 3D scanning device for measuring the three-dimensional shape of an object using projected light patterns and a camera system.

A quadcopter, also called a quadrotor helicopter or quadrotor, is a multirotor helicopter that is lifted and propelled by four rotors. Quadcopters are classified as rotorcraft, as opposed to fixed-wing aircraft, because their lift is generated by a set of rotors (vertically oriented propellers). Unlike most helicopters, quadcopters use two sets of identical fixed pitched propellers; two clockwise (CW) and two counter-clockwise (CCW). These use variation of RPM to control lift and torque. Control of vehicle motion is achieved by altering the rotation rate of one or more rotor discs, thereby changing its torque load and thrust/lift characteristics.

A Small Unmanned Ground Vehicle (SUGV) is a lightweight, man portable Unmanned Ground Vehicle (UGV) capable of conducting military operations in urban terrain, tunnels, sewers, and caves. The SUGV aids in the performance of manpower-intensive or high-risk functions (i.e. urban Intelligence, Surveillance, and Reconnaissance (ISR) missions, chemical/Toxic Industrial Chemicals (TIC), Toxic Industrial Materials (TIM), reconnaissance, etc.). Working to minimize Soldiers' exposure directly to hazards, the SUGV's modular design allows multiple payloads to be integrated in a plug and play fashion.

An Unmanned Ground Vehicle (UGV) is a vehicle that operates while in contact with the ground and without an onboard human presence. UGVs can be used for many applications where it may be inconvenient, dangerous, or impossible to have a human operator present. Generally, the vehicle will have a set of sensors to observe the environment, and will either autonomously make decisions about its behavior or pass the information to a human operator at a different location who will control the vehicle through teleoperation. The UGV is the land-based counterpart to unmanned aerial vehicles and remotely operated underwater vehicles. Unmanned robotics are being actively developed for both civilian and military use to perform a variety of dull, dirty, and dangerous activities.

SWAP constraints are directed to size, weight, and power of a military platform as defined by the military for a given platform and providing a basis for which a platform and utilize components from various manufacturers.

SUMMARY OF THE INVENTION

Structured light approaches utilize a laser to project features, which are then captured with a camera. By knowing the disparity between the laser emitter and the camera, the system can triangulate to find the range. In order to accommodate these sensors on a quadrotor, modifications will be done to the location of the camera and the laser emitters as taught by the present invention.

The proposed configuration makes use of multiple fisheye cameras and laser line scanners. Four, wide degree field-of-view cameras provide overlapping views over nearly the whole unit sphere. The cameras are separated from each other to provide parallax. A near-infrared laser projection unit sends light out into the environment. If the light hits objects in the environment it is reflected and viewed by the cameras.

The laser projection system will create vertical lines, while the cameras will be displaced from each other horizontally. This relative shift (stereo disparity) of the lines, as viewed by different cameras, enables the lines to be triangulated in 3D space. At each point in time, a vertical stripe of the world will be triangulated. Over time, the laser line will be rotated over all yaw angles to provide full 360 degree range sensing capabilities.

BRIEF DESCRIPTION OF THE DRAWINGS

The accompanying drawings, which are incorporated herein a form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Structured light approaches utilize a laser to project features, which are then captured with a camera. By knowing the disparity between the laser emitter and the camera, the system can triangulate to find the range. In sharp contrast, with conventional stereo and structure from motion, poor lighting actually improves the range and accuracy of this sensor. There is also no need to have rich features in the environment, since the laser "projects its own features." Therefore, it will even work on featureless walls and floors.

Figure 1:
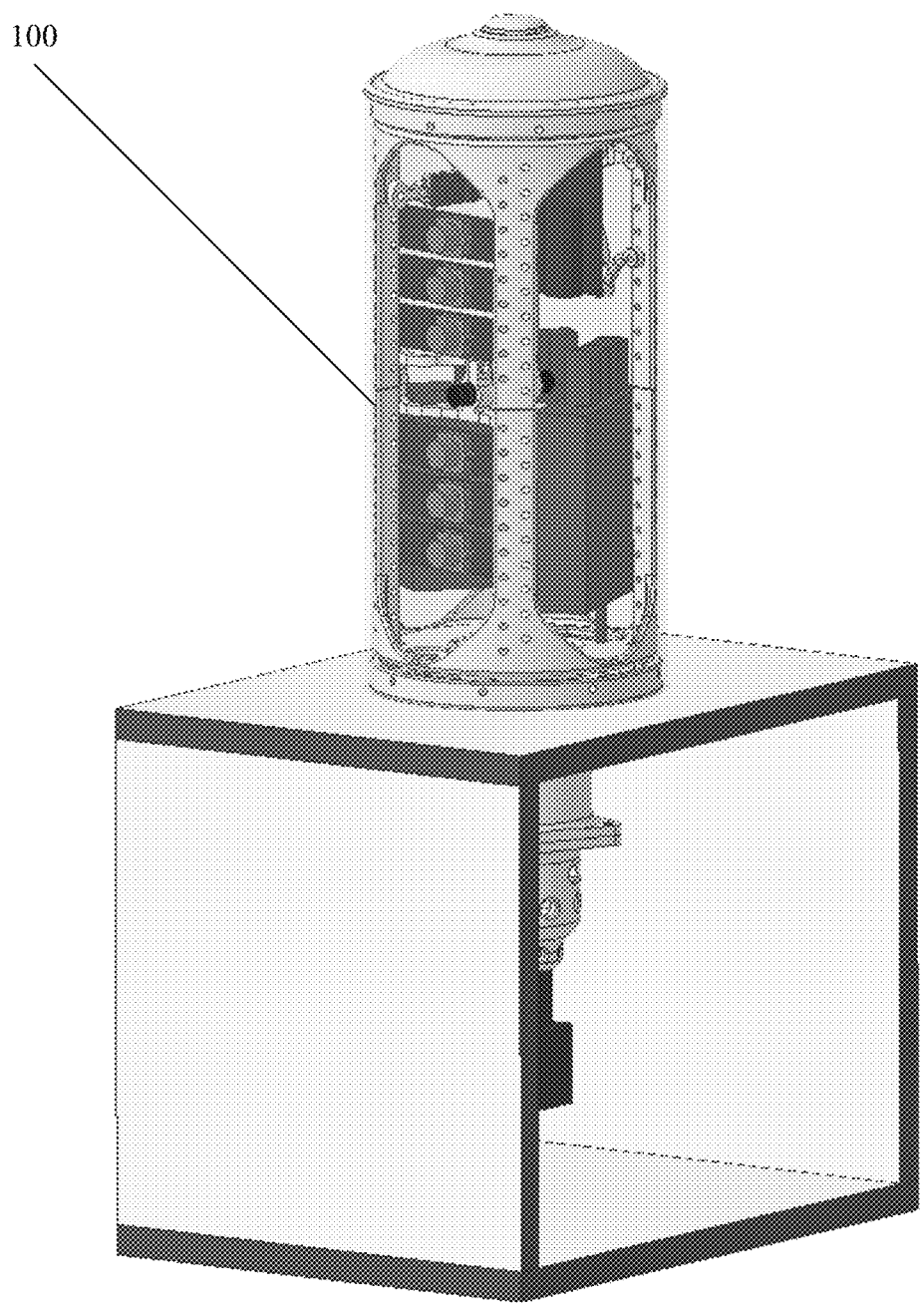
FIG. 1. MAPHAC is a structured light sensor that is designed for SUGVs.

One such approach is presented in FIG. 1, which is currently installed on a SUGV (small unmanned ground vehicle). It is designed to create very high density point clouds for mapping applications at two megapixels per second. FIG. 1 illustrates where a MAPHAC 100 is a structured light sensor that is designed for SUGVs.

Figure 2:
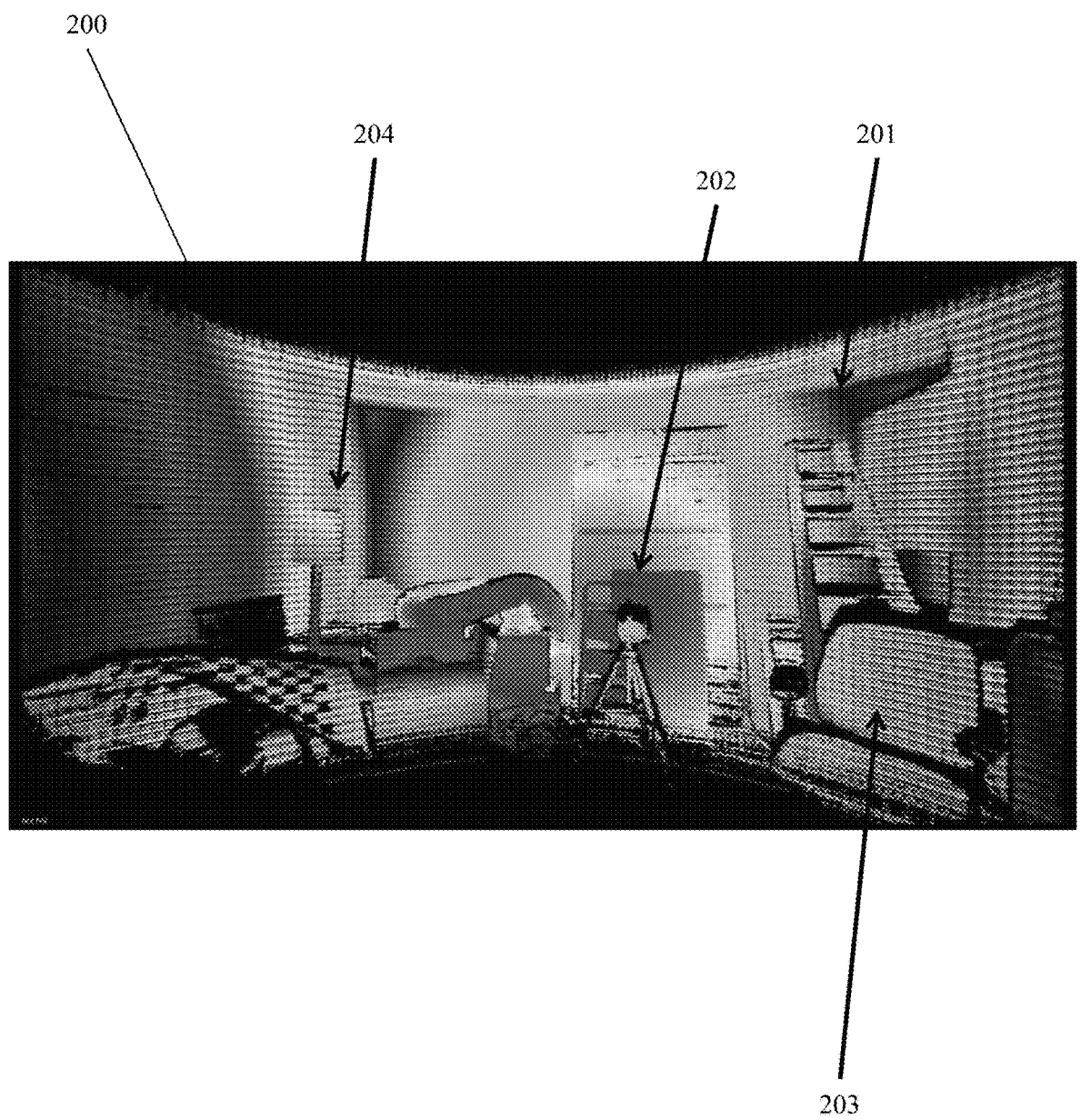
FIG. 2 Point cloud generated by MAPHAC, color-coded for range. The point cloud shows a leaning ladder, and a variety of office clutter.

FIG. 2, shows the scan of a typical cluttered room as a point cloud 200, including a ladder 201, a camera with a tripod 202, chairs 203, lamps 204, etc. In FIG. 2 the point cloud 200 generated by an MAPHAC is color-coded for range. The point cloud 200 shows a leaning ladder 201, and a variety of office clutter. The current incarnation of MAPHAC 100 is designed to become a substitute for a SUGV antenna, where it can serve as both an autonomous mobility sensor and radio antenna.

In order to accommodate these sensors on a quadrotor, modifications will be done to the location of the camera and the laser emitters. However, the core electronics and software have already been designed, but never used in this combination. The sensor is designed to meet the unique needs of an autonomous multicopter for indoor and outdoor environments, including: Large-field of view for obstacle avoidance and mapping; Light-weight system with minimal moving parts; Accurate ranges at short distances, with decreasing accuracy at longer ranges; Use of eye-safe lasers, while providing resilience to ambient light; and a Predicted weight under 150 grams.

The proposed configuration makes use of multiple fisheye cameras and laser line scanners. Four, 185 degree field-of-view cameras provide overlapping views over nearly the whole unit sphere. The cameras are separated from each other to provide parallax. A near-infrared laser projection unit sends light out into the environment, which is reflected and viewed by the cameras. The laser projection system will create vertical lines, while the cameras will be displaced from each other horizontally. This relative shift (stereo disparity) of the lines, as viewed by different cameras, enables the lines to be triangulated in 3D space.

At each point in time, a vertical stripe of the world will be triangulated. Over time, the laser line will be rotated over all yaw angles to provide full 360 degree range sensing capabilities as illustrated by FIGS. 3a, 3b, 3c, and 3d.

Figure 3A:
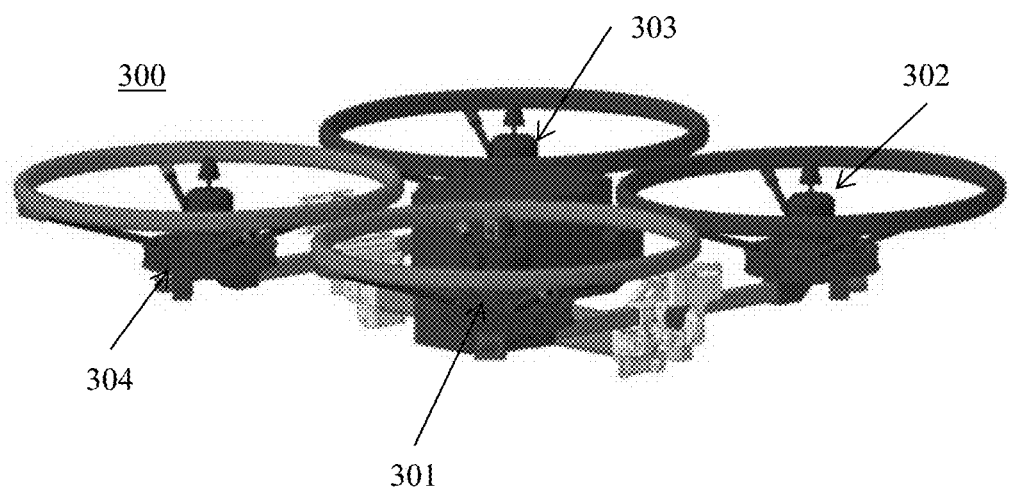
FIG. 3a. Quad copter with four imagers and laser projection system.
Figure 3B:
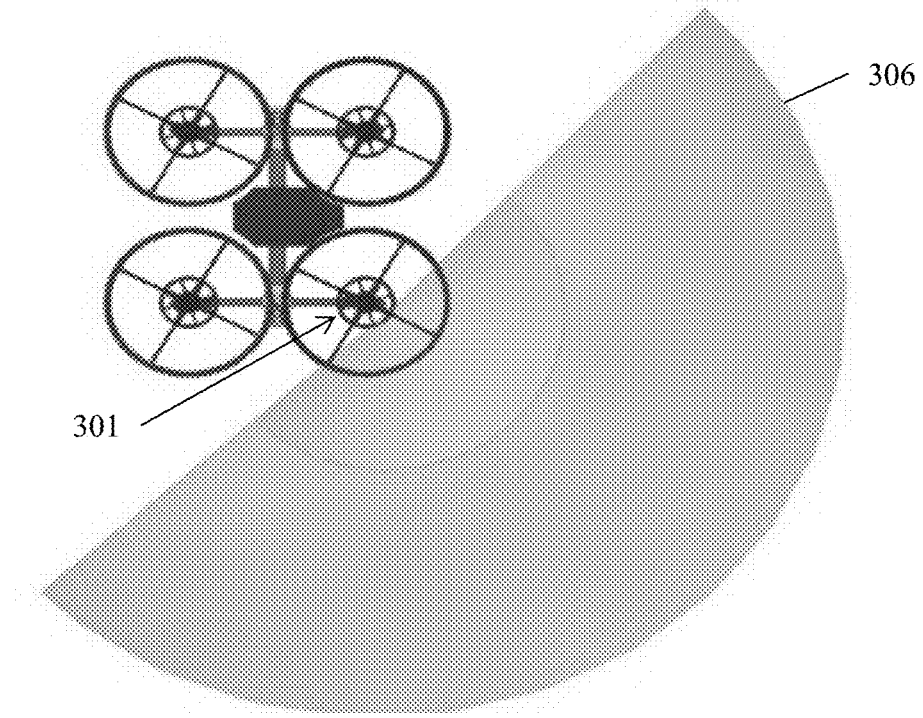
FIG. 3b. Approximate field-of-view of a single imager.
Figure 3C:
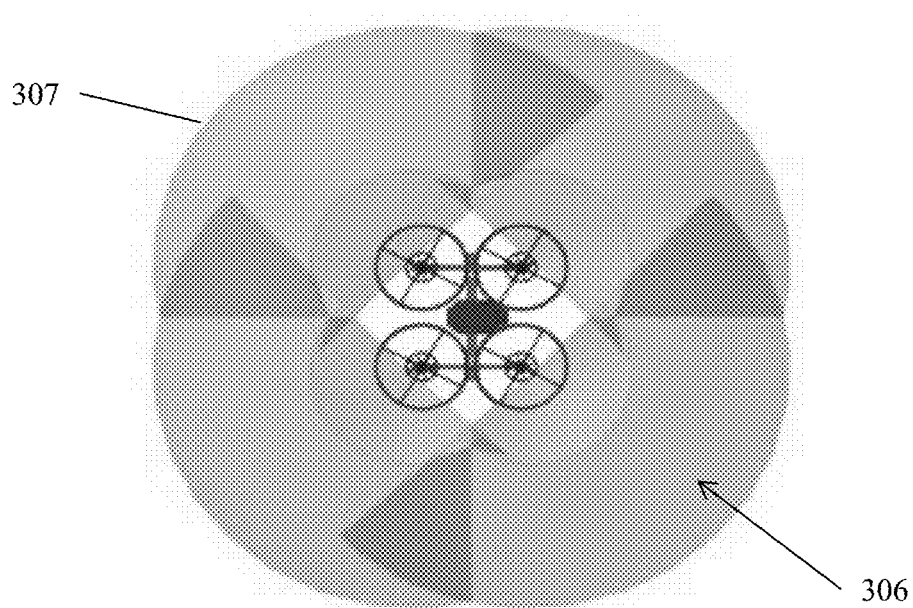
FIG. 3c. Overhead view of combined field-of-view of all imagers.
Figure 3D:
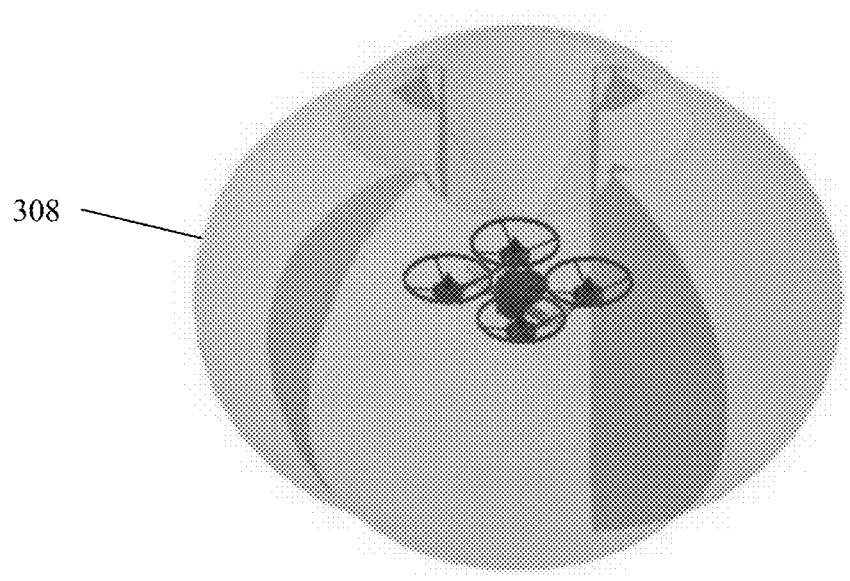
FIG. 3d. Side-view of combined field-of-view of all imagers.

FIG. 3a illustrates a Quad copter 300 with four imagers 301, 302, 303, and 304 and laser projection system 305. FIG. 3b illustrates an approximate field-of-view 306 of a single imager 301. FIG. 3c illustrates an overhead view of combined field-of-view 307 of all imagers 301, 302, 303, and 304. FIG. 3d illustrates a side-view of combined field-of-view 308 of all imagers.

Figure 4:
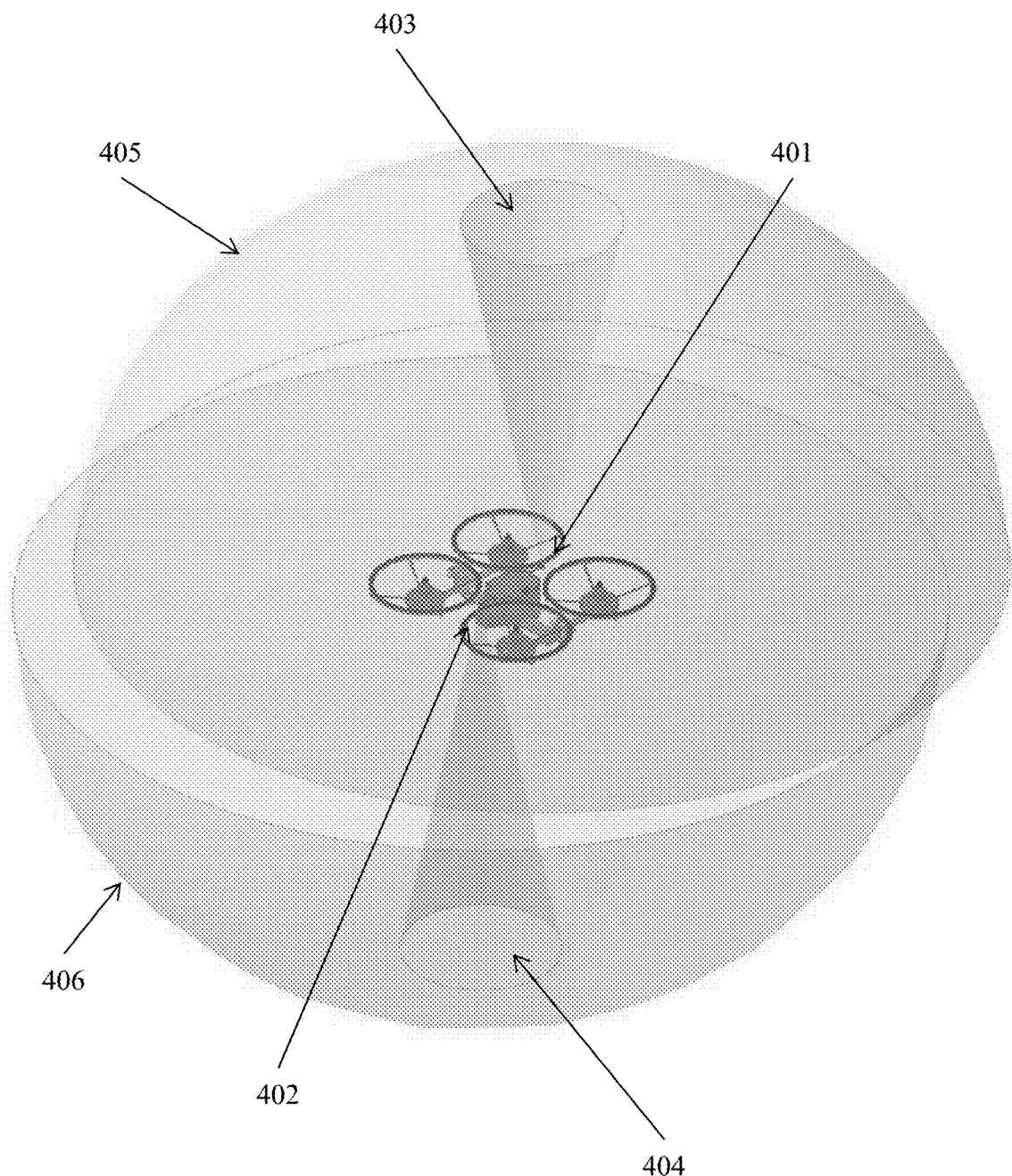
FIG. 4. Two laser line projectors are used to create a line that can then be sensed with the omnidirectional cameras.

FIG. 4 illustrates where two laser line projectors 401 and 402 are used to create a line 403 that can then be sensed with the omnidirectional cameras.

Each imager is composed of a camera module, a spectral filter, and a wide-angle compound lens. The camera must be small in size and weight, while providing high sensitivity and a wide dynamic range. Depending on mission requirements, an optical bandpass filter can be installed to attenuate incoming ambient light. If no filter is installed, the imaging system can be used as a visible light imager to provide full 360 degree RGB imagery in addition to point clouds.

A laser projection unit consists of a solid-state laser diode, laser pulsing circuitry, aspheric collimation lens, beam splitter, small rotating mirror, and laser line lens. The laser circuitry pulses the laser while also providing a frame trigger to each imager. The laser light is collimated into a beam 403 and 404 using a small aspheric lens directly in front of the laser. The laser beam is then split into an upward and downward beam 403 and 404. Each beam 403 and 404 is reflected off a small rotating mirror coupled to a laser line lens. The upward beam 403 creates a laser line that extends from horizontal to positive 80 degrees pitch, while the downward beam 404 creates a laser line that extends from horizontal to negative 80 degrees pitch.

Figure 5:
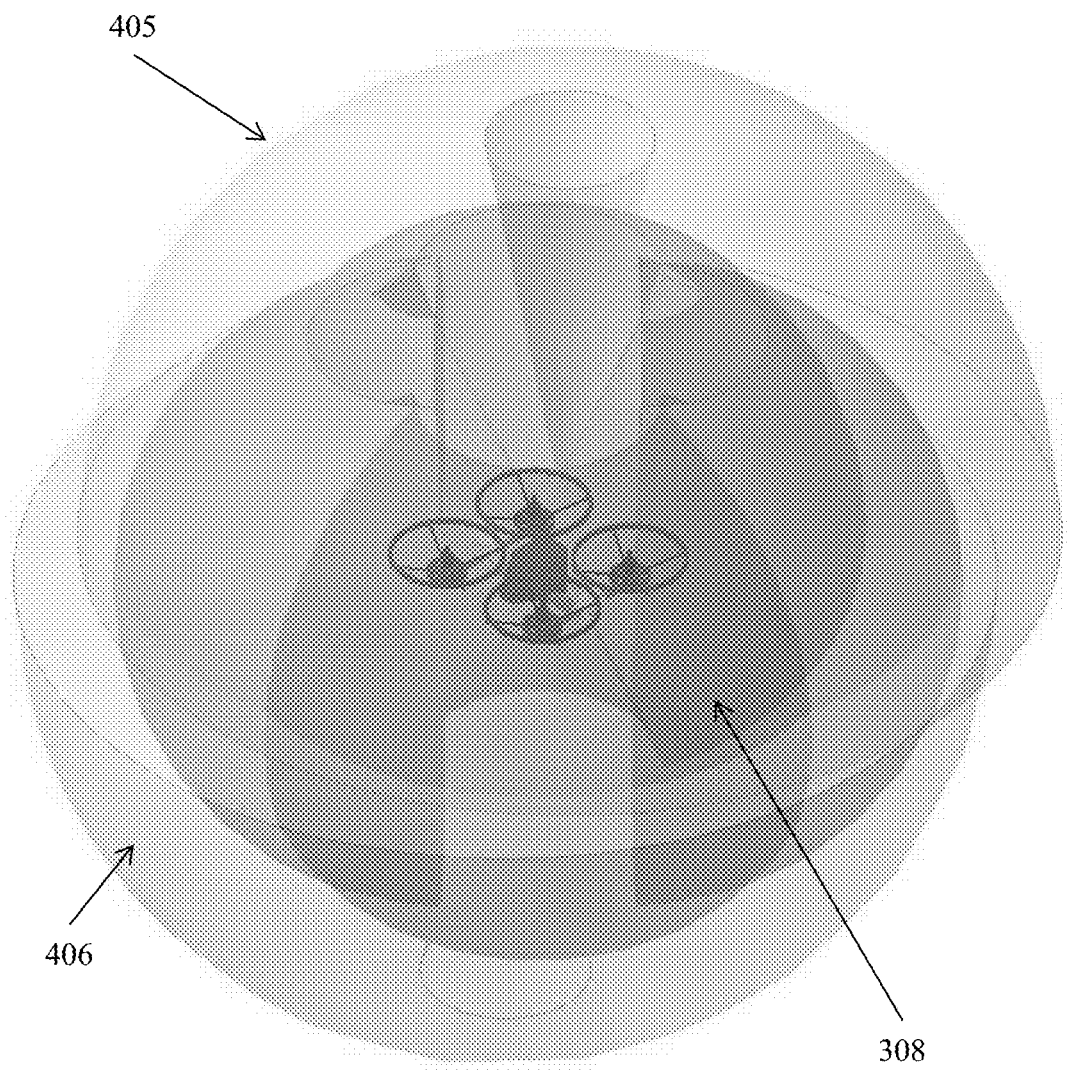
FIG. 5. Complete field of view showing laser and cameras.

The proposed field-of-view (shown in FIG. 4) shows the field-of-view of the projected lines 403 and 404. FIG. 5 shows the combined field-of-view of the cameras 405 and 406 and laser projectors 308.

The structured light sensor will be able to measure 360 degrees horizontally and 160 degrees vertically. At each point in time, the sensor will generate approximately 2080 vertical range measurements. With each imager capturing approximately 180 images/second, the sensor will be able to generate over 370 k points per second.

The yaw scan rate can be varied, depending upon the current mission needs. The sensor can be operated with a fine yaw resolution and slow scan rate, providing detailed scans of the environment; or, the sensor can be operated with a faster yaw rate, providing faster updates at a coarser rate.

Figure 6:
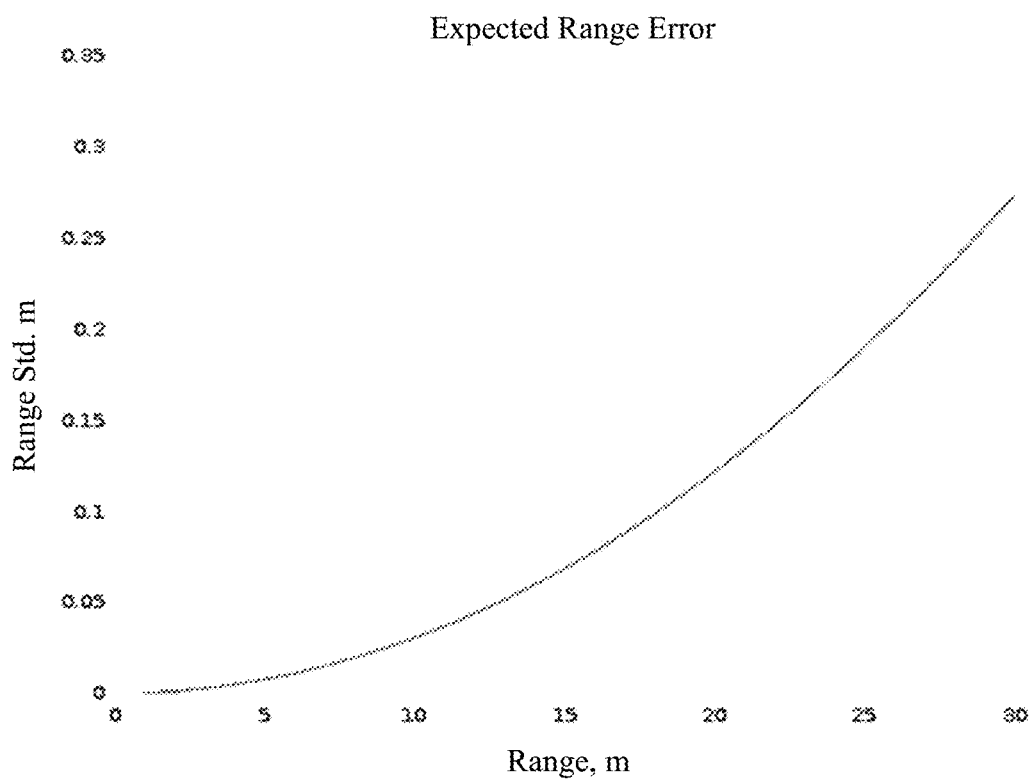
FIG. 6. Expected range error of structured light sensor.

Since this device relies on triangulation, the range accuracy will be dependent on range. The expected range error 600 is shown in FIG. 6 in graph format.

A second approach is to use a time-of-flight line sensor to perform the same task as shown with the structured light sensor. The line sensors can be organized as seen in FIGS. 7a and 7b.

Figure 7A:
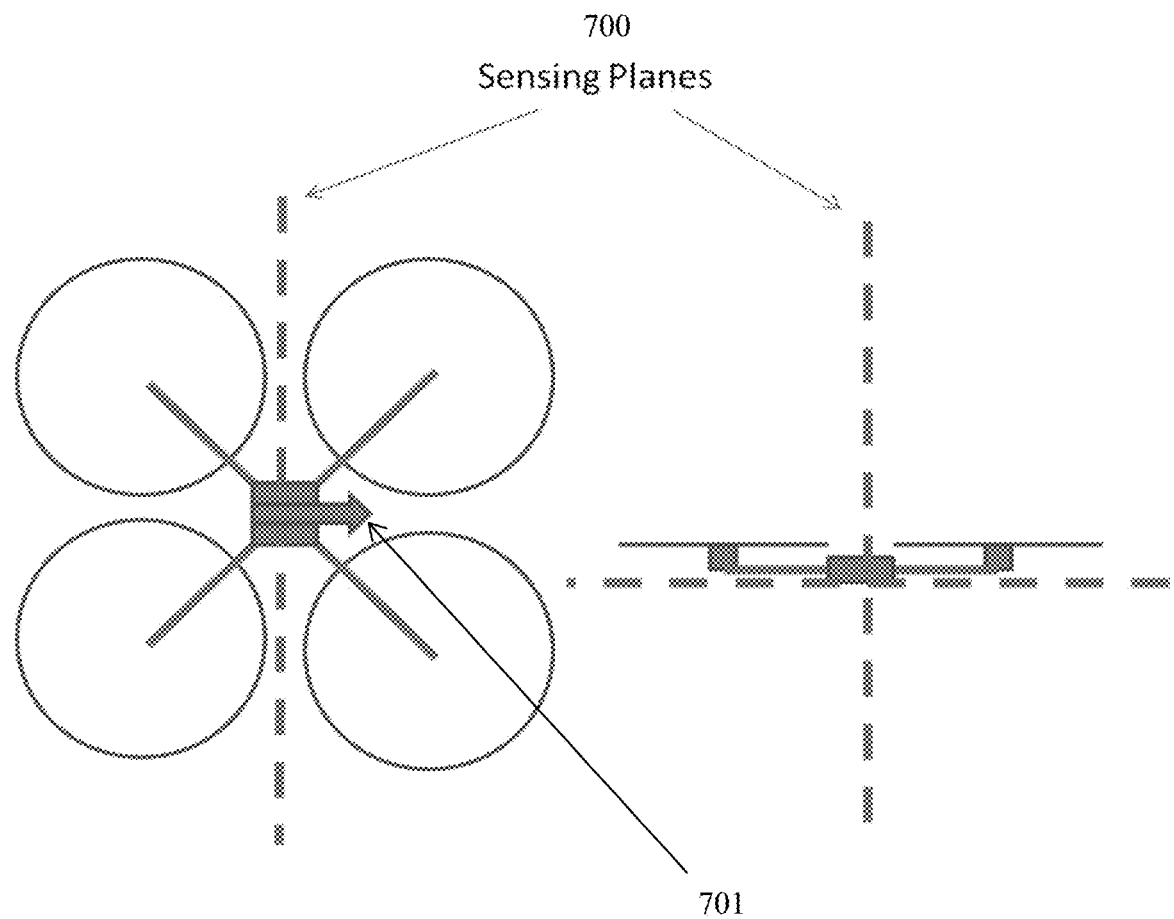
FIGS. 7a and 7b. Prototype sensing plane configuration.
Figure 7B:
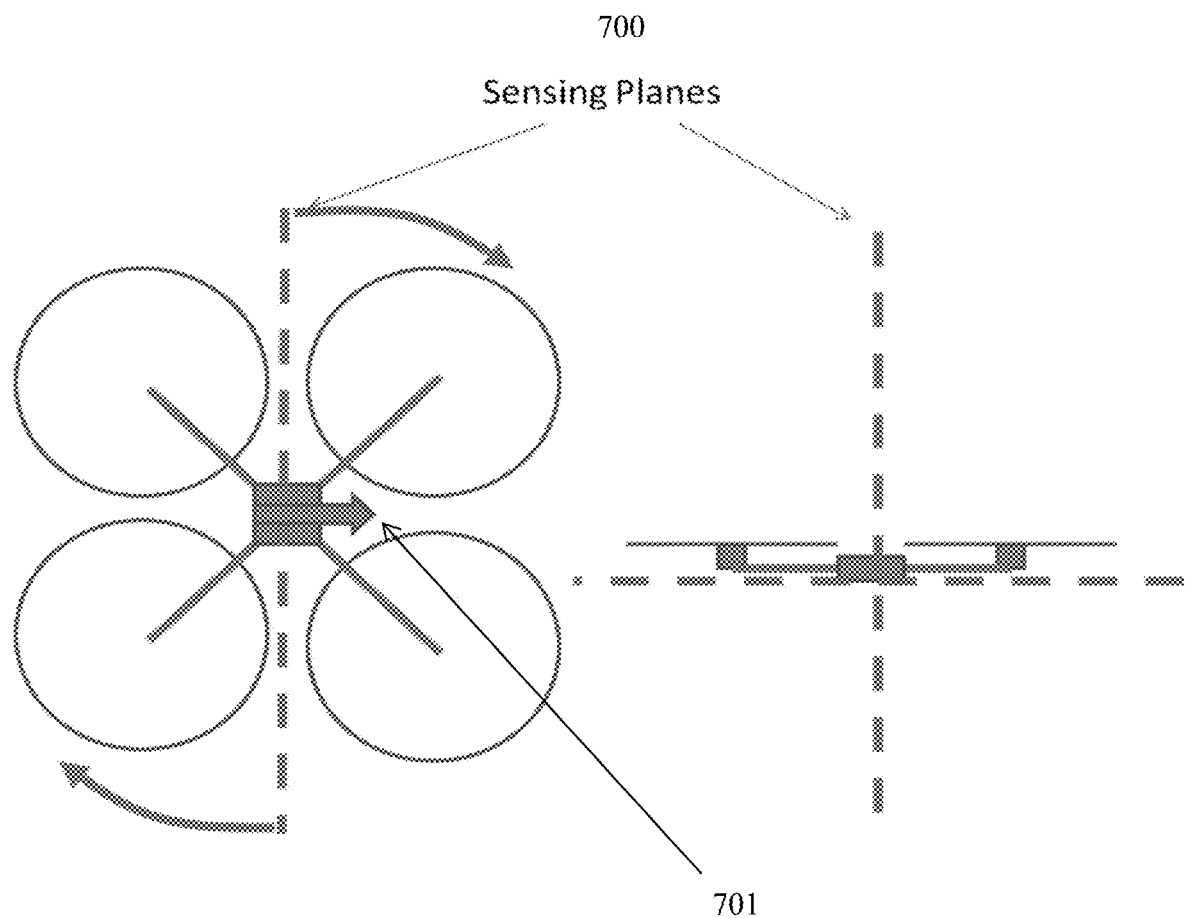

One more possible configuration is the same as shown in FIGS. 7a and 7b, but with the vertical sensing plan 700 aligned with the direction of travel 701.

The system is composed of a quadrotor, or other UAV, and one or more range sensors that are used to sense the surrounding environment.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A low-light environment obstacle avoidance-enabled UAV, comprising:
   a plurality of fisheye cameras displaced from each other horizontally, each camera comprising a wide-angle compound lens;
   a plurality of near-infrared laser projection line scanners displaced to simultaneously project a plurality of vertical laser lines in an environment surrounding the UAV, thereby generating vertical line light pattern projections, each laser projection line scanner comprising a solid-state laser diode and an aspheric collimation lens coupled in front of a laser emitter and that splits a laser beam emitted from the emitter into upward and downward vertical line portions;
   a UAV rotation mechanism operable to alter a yaw orientation of the plurality of near-infrared laser projection line scanners; and
   a microprocessor in communication with the plurality of fisheye cameras, the plurality of near-infrared laser projection line scanners, and the UAV rotation mechanism, the microprocessor being configured to:
   (i) operate the UAV rotation mechanism to alter a first yaw orientation of the plurality of near-infrared laser projection line scanners at a first point in time to a second yaw orientation of the plurality of near-infrared laser projection line scanners at a second point in time,
   (ii) process images captured by the plurality of fisheye cameras to: (a) triangulate, at the first point in time and based on first identified locations of first vertical line light pattern projections from the near-infrared laser projection line scanners a first plurality of point locations in a 3-D space comprising the environment surrounding the UAV, and
   (b) triangulate, at the second point in time and based on second identified locations of second vertical line light pattern projections from the near-infrared laser projection line scanners a second plurality of point locations in the 3-D space comprising the environment surrounding the UAV, thereby defining a point cloud, and
   (iii) conduct, based on the point cloud, an obstacle avoidance navigation of the UAV.

2. The low-light environment obstacle avoidance-enabled UAV of claim 1, wherein the downward vertical line portion of the laser beam creates a laser line that extends from horizontal to negative 80 degrees pitch.

3. The low-light environment obstacle avoidance-enabled UAV of claim 1, wherein the upward vertical line portion of the laser beam creates a laser line that extends from horizontal to positive 80 degrees pitch.

4. The low-light environment obstacle avoidance-enabled UAV of claim 1, wherein each camera comprises a spectral filter.

5. The low-light environment obstacle avoidance-enabled UAV of claim 1, wherein each camera comprises an optical bandpass filter.

6. The low-light environment obstacle avoidance-enabled UAV of claim 1, wherein the vertical laser lines are projected along a vertical sensor plane and wherein the vertical sensor plane is aligned with a direction of travel of the UAV.

\* \* \* \* \*